(12) United States Patent
Poisson

(10) Patent No.: US 9,092,029 B2
(45) Date of Patent: Jul. 28, 2015

(54) VEHICLE MONITORING SYSTEM

(75) Inventor: Richard A. Poisson, Avon, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 880 days.

(21) Appl. No.: 12/427,691

(22) Filed: Apr. 21, 2009

(65) Prior Publication Data

US 2010/0268403 A1  Oct. 21, 2010

(51) Int. Cl.
*G05B 23/02* (2006.01)

(52) U.S. Cl.
CPC .................................. *G05B 23/0213* (2013.01)

(58) Field of Classification Search
USPC .......................................................... 701/36
See application file for complete search history.

(56) References Cited

U.S. PATENT DOCUMENTS

| | | | |
|---|---|---|---|
| 4,970,648 A | 11/1990 | Capots | |
| 5,508,689 A * | 4/1996 | Rado et al. | 340/3.1 |
| 5,659,680 A | 8/1997 | Cunningham et al. | |
| 5,838,261 A | 11/1998 | Lauta et al. | |
| 5,869,907 A * | 2/1999 | Marler | 307/10.1 |
| 6,107,696 A * | 8/2000 | Peter et al. | 307/31 |
| 6,138,081 A | 10/2000 | Olejack et al. | |
| 6,192,302 B1 * | 2/2001 | Giles et al. | 701/29.6 |
| 6,441,510 B1 * | 8/2002 | Hein et al. | 307/10.1 |
| 6,504,730 B1 | 1/2003 | Cooney et al. | |
| 6,608,399 B2 * | 8/2003 | McConnell et al. | 307/10.1 |
| 6,640,560 B2 | 11/2003 | Rohrbach et al. | |
| 6,898,492 B2 | 5/2005 | de Leon et al. | |
| 7,103,456 B2 | 9/2006 | Bloch et al. | |
| 7,167,788 B2 | 1/2007 | Loda et al. | |
| 7,246,003 B2 | 7/2007 | Loda et al. | |
| 7,251,554 B2 | 7/2007 | Loda et al. | |
| 7,259,357 B2 * | 8/2007 | Walker | 219/243 |
| 7,489,992 B2 | 2/2009 | Valette et al. | |
| 7,495,403 B2 * | 2/2009 | Soudier et al. | 318/432 |
| 7,854,127 B2 | 12/2010 | Brown | |
| 2002/0105228 A1 | 8/2002 | Zecca et al. | |
| 2004/0206818 A1 | 10/2004 | Loda et al. | |
| 2006/0180371 A1 * | 8/2006 | Breed et al. | 180/197 |
| 2008/0092520 A1 | 4/2008 | Brown | |
| 2010/0106870 A1 * | 4/2010 | Saugnac | 710/63 |

FOREIGN PATENT DOCUMENTS

| | | |
|---|---|---|
| JP | 20062759 | 7/2007 |
| WO | 0113186 | 2/2001 |

OTHER PUBLICATIONS

Japanese Office Action for Japanese Patent Application No. 2010-95583 dated Jun. 18, 2013.
Extended European Search Report for European Application No. 10250797.7 dated Jun. 20, 2013.

* cited by examiner

*Primary Examiner* — Nicholas Kiswanto
(74) *Attorney, Agent, or Firm* — Carlson, Gaskey & Olds, P.C.

(57) ABSTRACT

An example reconfigurable vehicle monitoring arrangement includes a housing securable relative to a vehicle, a communication base at least partially disposed within the housing, and a universal connector assembly configured to selectively operatively connect the communication base with a plurality of different modules. At least one of the modules is configured to communicate data gathered from a plurality of vehicle data sources to the communication base.

18 Claims, 4 Drawing Sheets

VEHICLE MONITORING SYSTEM

BACKGROUND

This application relates generally to a monitoring system for a vehicle, and more particularly, to a reconfigurable monitoring system.

As known, a monitoring system for a vehicle acquires data from various data sources. Example data sources include vibrations, temperatures, pressures, fluid levels, debris monitors, switch closures, etc. In some examples, sensors distributed throughout the vehicle gather data from the data sources. The gathered data is then communicated from the sensors to the monitoring system. Technicians interact with the monitoring system to obtain data, rather than separately communicating with each sensor. Technicians use the gathered data to estimate how operating conditions have influenced the health of a component within the vehicle, for example. Aircraft are one type of vehicle that utilize monitoring systems. Many aircraft include a prognostic and health monitoring system that gathers data from a gas turbine engine of the aircraft and the surrounding areas.

The typical monitoring system is designed to gather specific types of data. Gathering different types of data, gathering additional data, or responding to changing data requirements requires replacing or extensive redesign of the monitoring system, which can be costly and time consuming. For example, on the aircraft, communications between temperature sensors and the monitoring system often require higher speed connections than communications between vibration sensors and the monitoring system. Accordingly, the monitoring system is initially built to include specific high speed connections associated with a specific number of temperature sensors and specific low speed connections associated with a specific number of vibration sensors. If a technician wants the monitoring system to later gather different types or quantities of the data sources, the entire monitoring system must be replaced or the entire monitoring system must be removed from the aircraft and redesigned.

SUMMARY

An example reconfigurable vehicle monitoring arrangement includes a housing securable relative to a vehicle, a communication base at least partially disposed within the housing, and a universal connector assembly configured to selectively operatively connect the communication base with a plurality of different modules. At least one of the modules is configured to communicate data between gathered from a plurality of vehicle data sources to the communication base.

An example modular vehicle monitoring system includes a housing, a communication base, a first module, a second module, and a universal connector. The communication base is configured to selectively engage the first module, the second module, or both using the universal connector portion. At least one of the first module and the second module is configured to communicate data gathered from a plurality vehicle data sources to the communication base.

An example method of monitoring data sources includes connecting a first module arrangement to a communication base of a vehicle monitoring system using at least one universal connector. The first module arrangement is configured to communicate with at least one vehicle data source. The method also includes reconfiguring vehicle monitoring system to include a second module arrangement by connecting the second module arrangement to the communication base of the vehicle monitoring system using the at least one universal connector. The second module arrangement is configured to communicate with at least one other vehicle data source.

These and other features of the example disclosure can be best understood from the following specification and drawings, the following of which is a brief description:

DETAILED DESCRIPTION

Figure 1:
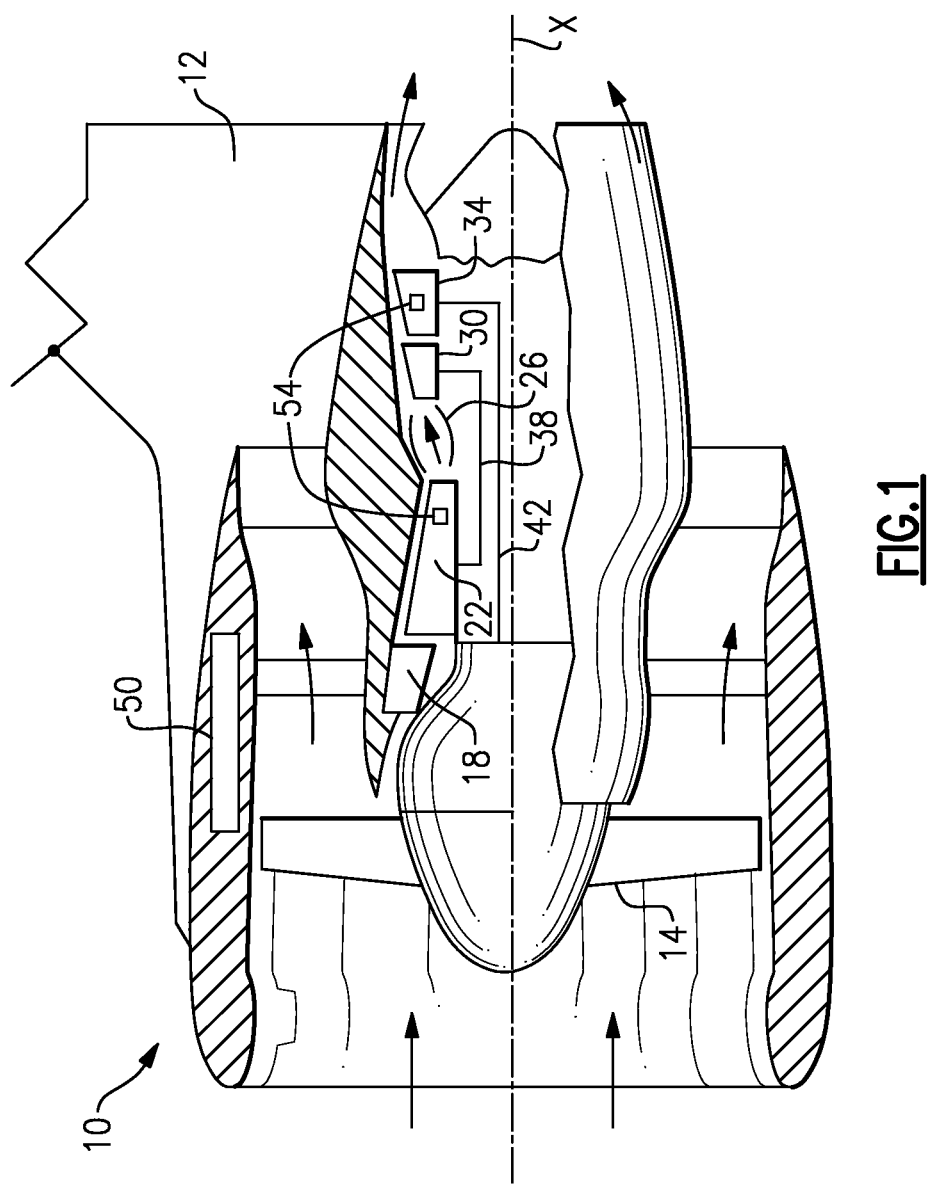
FIG. 1 shows a schematic view of an example gas turbine engine having a monitoring system.

FIG. 1 schematically illustrates an example gas turbine engine 10 of an aircraft 12. The gas turbine engine 10 includes (in serial flow communication) a fan section 14, a low-pressure compressor 18, a high-pressure compressor 22, a combustor 26, a high-pressure turbine 30, and a low-pressure turbine 34. The gas turbine engine 10 is circumferentially disposed about an engine centerline X. During operation, air is pulled into the gas turbine engine 10 by the fan section 14, pressurized by the compressors 18 and 22, mixed with fuel, and burned in the combustor 26. The turbines 30 and 34 extract energy from the hot combustion gases flowing from the combustor 26.

In a two-spool design, the high-pressure turbine 30 utilizes the extracted energy from the hot combustion gases to power the high-pressure compressor 22 through a high speed shaft 38. The low-pressure turbine 34 utilizes the extracted energy from the hot combustion gases to power the low-pressure compressor 18 and the fan section 14 through a low speed shaft 42.

Figure 2:
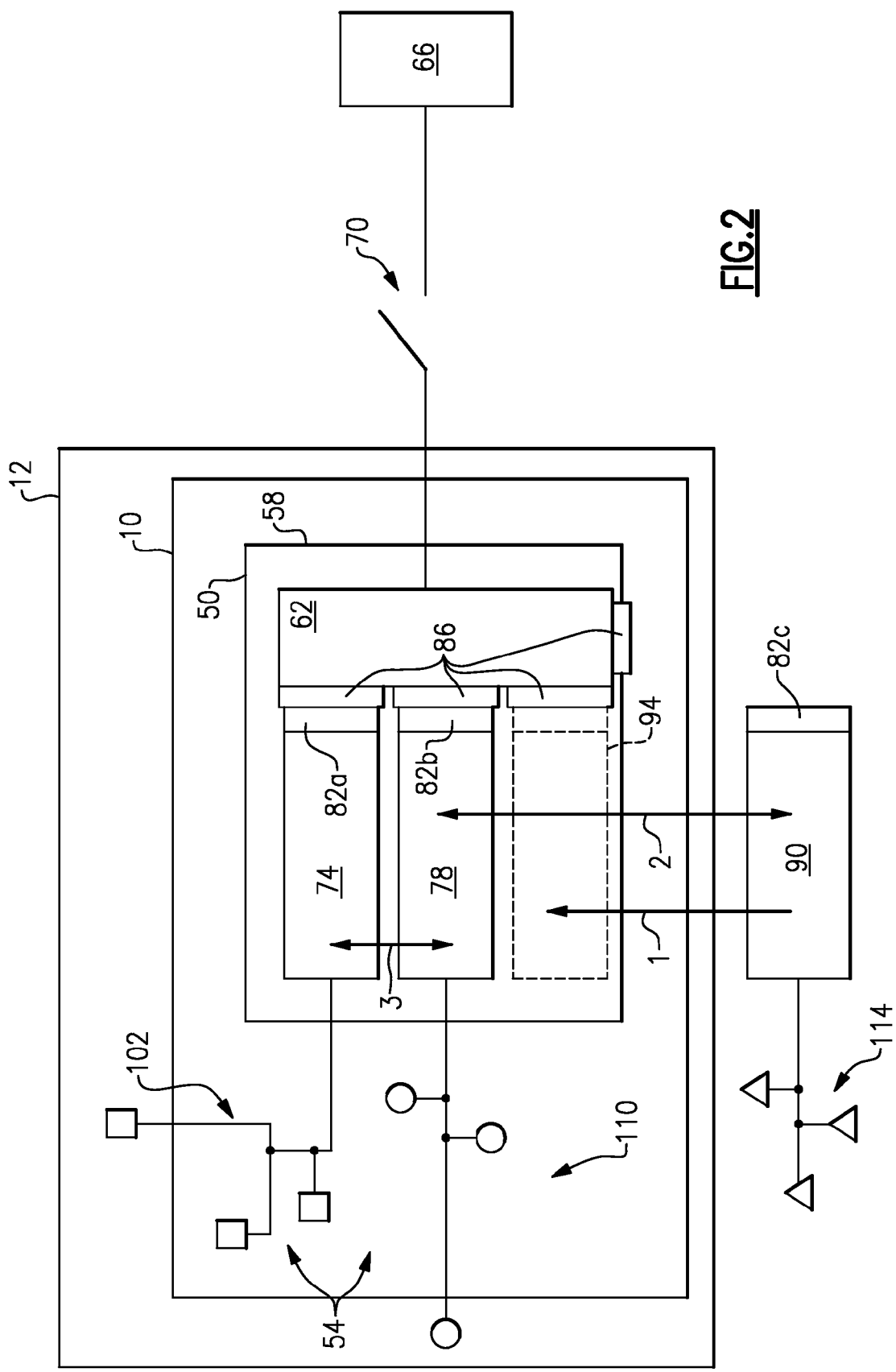
FIG. 2 shows a schematic view of the FIG. 1 gas turbine engine and monitoring system.

Referring now to FIG. 2 with continuing reference to FIG. 1, a monitoring system 50 is secured to the engine 10 in this example. The monitoring system 50 communicates with a multiple of data sources. The sensors 54 distributed within the aircraft 12 facilitate communicating between the monitoring system 50 and data sources of the aircraft 12. In this example, some of the sensors 54 are located outside the engine 10 near components of the aircraft 12 other than the engine 10.

The examples described in this disclosure relating to the gas turbine engine 10 are not limited to the two-spool architecture described and may be used in other architectures, such as a single-spool axial design, a three-spool axial design, and still other architectures. Further, the examples in this disclosure are not limited to only monitoring components like the engine 10 or to only vehicles like the aircraft 12. In other examples, the monitoring system 50 monitors other components and is used in other types of vehicles, such as water-based vehicles or land-based vehicles. That is, there are various types of components and vehicles that could benefit from the examples disclosed herein.

The example monitoring system 50 includes a housing 58 and a communication base 62. A technician 66 selectively communicates with the communication base 62 to retrieve data from the monitoring system 50 in a known manner. In this example, a switch 70 represents the selective communication between the technician 66 and the communication base 62. The technician 66 communicates with the communication base 62 only when the aircraft 12 is on the ground in one example. In another example, the technician 66 wirelessly communicates with the communication base 62 during flight to obtain data as the data is collected from the aircraft 12.

The example monitoring system 50 also includes a first module 74 and a second module 78. The communication base 62 engages the first module 74 and the second module 78 to collect information from the sensors 54.

The first module 74 includes a bus connector portion 82*a* for selectively engaging a bus subsystem 86 of the communication base 62. Engaging the bus subsystem 86 with the bus connector portion 82*a* provides a communication path for data to move between the first module 74 and the communication base 62. The first module 74 is shown in an engaged position in this example.

The second module 78 includes a bus connector portion 82*b* for selectively engaging the bus subsystem 86 of the communication base 62. Engaging the bus subsystem 86 with the bus connector portion 82*b* provides a communication path for data to move between the first module 74 and the communication base 62. The second module 78 is shown in an engaged position in this example.

A third module 90 includes a bus connector portion 82*c* for selectively engaging the bus subsystem 86 of the communication base 62. The communication base 62 establishes an area 94 for receiving the third module 90 when the bus connector portion 82*c* is engaged with the bus subsystem 86. In this example, the third module 90 is shown in a disengaged position and the area 94 is entirely within the housing 58 of the monitoring system 50. In another example, a portion of the area 94 extends outside the housing 58. That is, a portion of the third module 90 extends outside the housing 58 when the bus connector 82*c* is engaged with the bus subsystem 86.

Relative to the bus subsystem 86 of the communication base 62, the bus connector portions 82*a*-82*c* are the same. Accordingly, the monitoring system 50 can be reconfigured to include different arrangements of the first module 74, the second module 78, and the third module 90. For example, moving the third module 90 along path 1 to the area 94 would reconfigure the monitoring system 50 to include the third module 90 in an engaged position. The third module 90 can also move along path 2 and replace the second module 78 to provide another configuration. In yet another configuration, the second module 78 can move along path 3 and swap places with the first module 74. Reconfiguring the first module 74, the second module 78, and the third module 90 does not disrupt the communication base 62. A person having skill in this art and the benefit of this disclosure would recognize that many other configurations are possible.

In this example, the first module 74 is operatively connected to a first sensor group 102, and the second module 78 is operatively connected to a second sensor group 110. The sensors 54 in the first sensor group 102 are configured to monitor temperatures of the engine 10, and the sensors 54 in the second sensor group 110 are configured to monitor vibrations of the engine 10, for example.

The first module 74, the second module 78, and the third module 90 each include hardware and software specific to communications between the communication base 62 and the sensors that are connected to that module, for example. Thus, the communication base 62 does not need to undergo significant changes to receive data gathered by different groups of the sensors 54.

The third module 90 is operatively connected to a third sensor group 114, which, in this example, is added to the aircraft 12 when the third module 90 is added to the monitoring system 50 along path 1. In another example, the sensors 54 in the third sensor group 114 are already mounted to the aircraft 12, and are operatively linked to the third module 90 once the third module 90 is in an engaged position with the monitoring system 50.

In this example, the sensors 54 in the third sensor group 114 are configured to monitor temperatures. Adding the third module 90 to the monitoring system 50 thus provides more temperature data to the communication base 62, which the technician 66 can selectively access. In another example, the third module 90 is a specialized diagnostic module that facilitates troubleshooting the monitoring system 50. In yet another example, the third module 90 comprises a wireless communication card for communications between the monitoring system 50 and the technician 66. As can be appreciated, the third module 90 can engage the communication base 62 without requiring significant redesign of the monitoring system 50.

Figure 3:
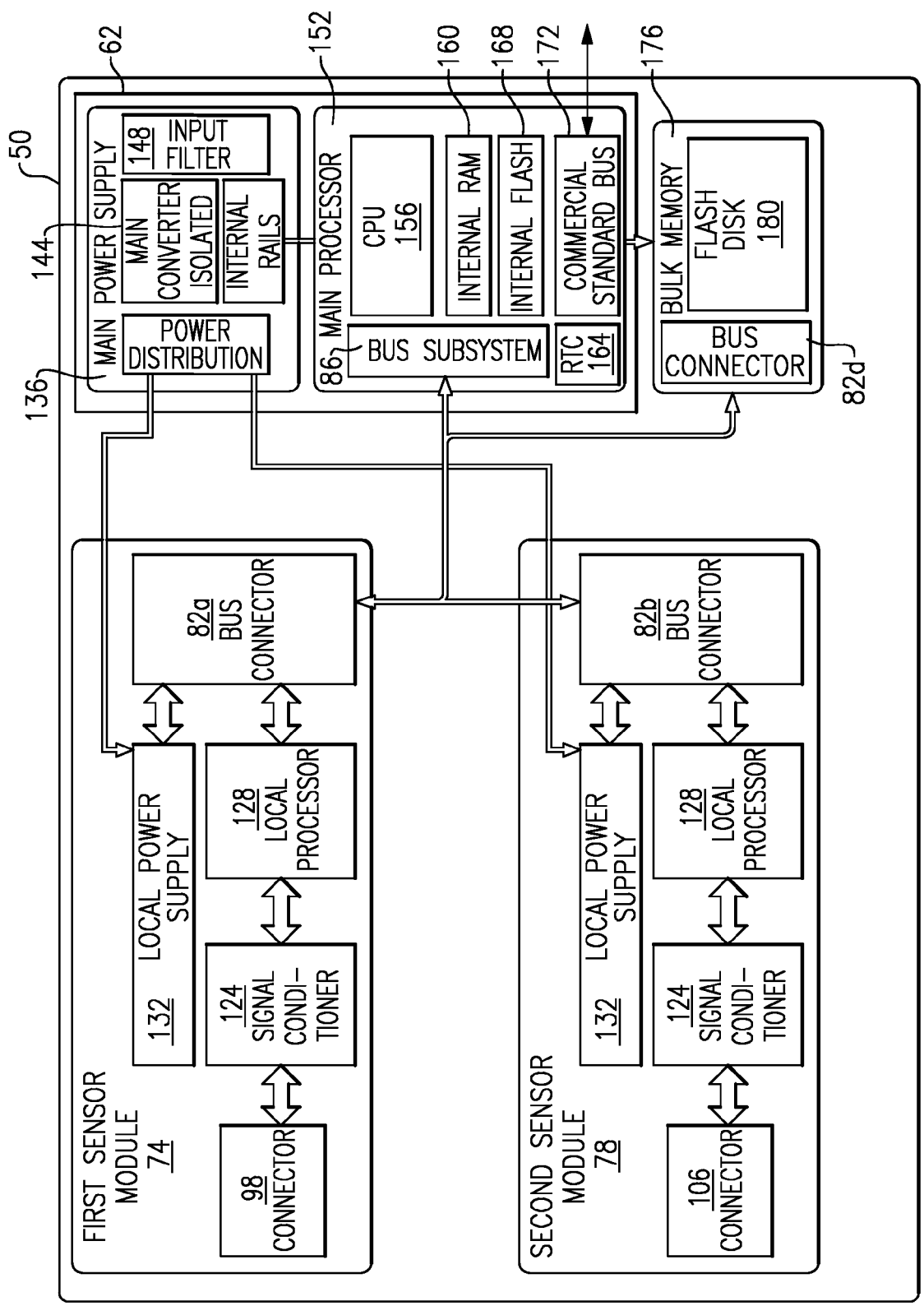
FIG. 3 shows a schematic view of another example monitoring system suitable for use within the FIG. 1 engine.

Referring to FIG. 3 with continuing reference to FIG. 2, the first module 74 comprises the connector 98, a signal conditioner 124, a local processor 128, and a local power supply 132. The signal conditioner 124 and the local processer 128 facilitate adapting data from the sensors 54 through the connector 98 into a format appropriate for transferring through the bus connector portion 82*a* to the communication base 62.

The second module 78 includes elements in this example similar to the first module 74. Although the elements are similar, however, some of the construction of the first module 74 and the second module 78 varies depending on the data sources that are monitored. For example, the first module 74 is a temperature monitoring module and thus includes circuitry appropriate for lower speed communications. The second module 78 is a vibration monitoring module and thus includes circuitry appropriate for higher speed communications. Even though the circuitry of the first module 74 and the second module 78 differ, however, the connection interface with the bus subsystem 86 remains consistent.

The example communication base 62 comprises a motherboard that includes a main power supply 136 that provides power to the first module 74 and the second module 78 through a power distribution element 140. A main converter 144 and an input filter 148 facilitate adjusting the power for use.

The motherboard further includes a main processor 152 having a central processing unit (CPU) 156, a supply of internal RAM 160, a real time clock (RTC) 164, and a supply of internal flash memory 168. The main processor 152 also includes the bus subsystem 86 that is configured to selectively communicate with the central bus interface 82 of the first module 74 and the central bus interface 82 of the second module 78. In this example, the main processor 152 includes a commercial standard bus 172, which facilitates selective communication between the technician 66 and the monitoring system 50.

Notably, including the local processor 128 on the each of the first module 74, the second module 78, and the third module 90, rather than relying entirely on the main processor 152 decreases the processing burden on the main processor 152.

The example monitoring system 50 also includes a bulk memory portion 176 having a flash disk memory portion 180 and central bus interface 82*d*, which is configured to receive a fourth module (not shown) having a portion outside the housing 58 when in an engaged position with the communication base 62. Internal rails 184 provide power from the main power supply 136 to the main processor 152 and the bulk memory 176 in this example.

Figure 4:
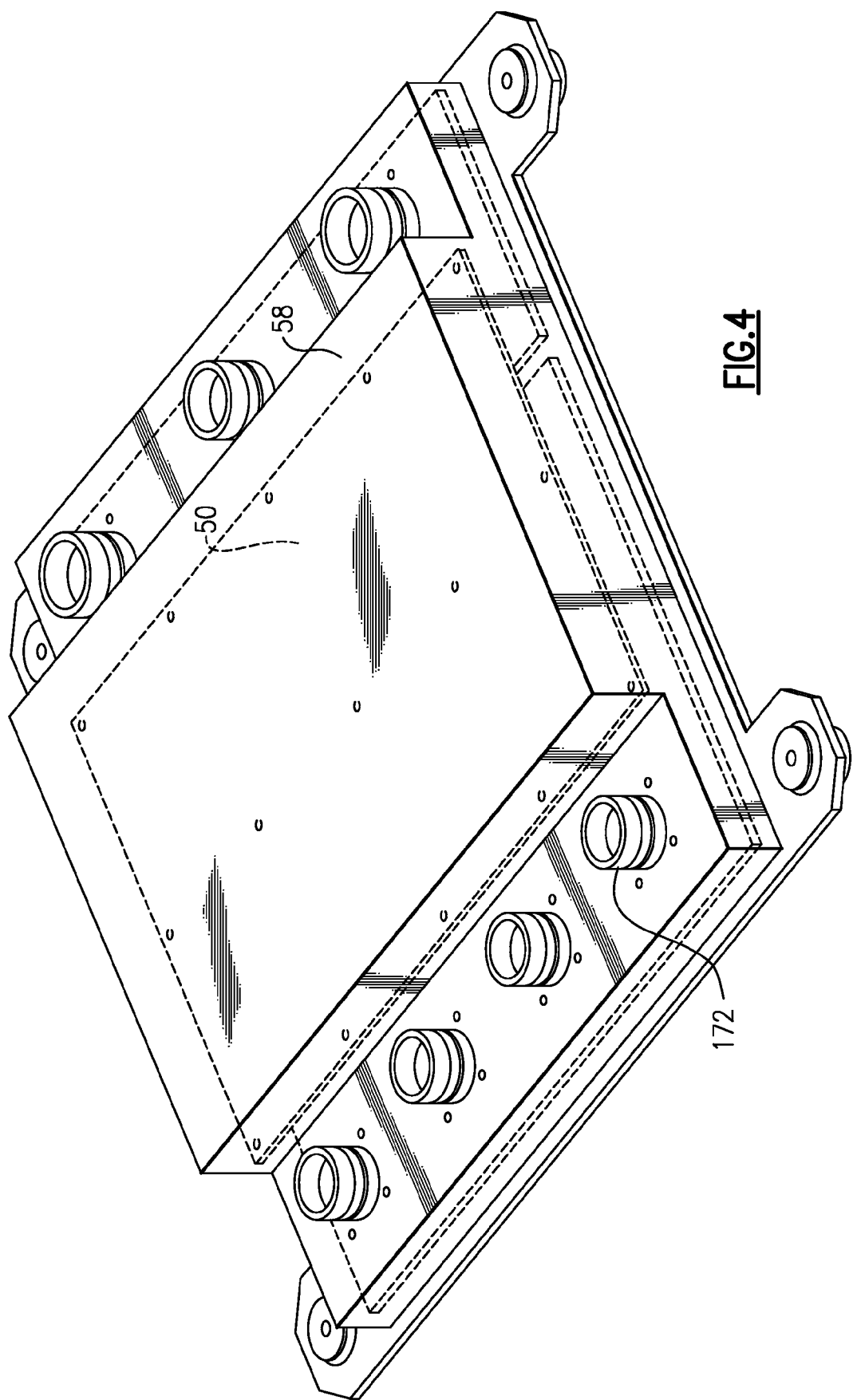
FIG. 4 shows a perspective view of the FIG. 3 monitoring system.

Referring to FIG. 4, a handle 180 extends from the housing 58 to assist with carrying the monitoring system 50. The commercial standard bus 172 extends through the housing 58 to facilitate communicating with the main processor 152 within the housing 58.

Features of the disclosed embodiments include a reconfigurable monitoring system that can be adjusted to change or add monitored data sources without replacing the monitoring system or requiring substantial redesign of the mounting assembly. The mounting assembly is used for prognostic and health monitoring of a gas turbine engine for example. Another feature of the disclosed embodiment is that the motherboard is not required to process signals from the sensors, because that processing takes place within the modules; i.e., the modules are dedicated to the specialized processing associated with specific data sources. Another feature is that the modules can be swapped without significantly changing the motherboard or other portions of the monitoring system.

Although a preferred embodiment has been disclosed, a worker of ordinary skill in this art would recognize that certain modifications would come within the scope of this invention. For that reason, the following claims should be studied to determine the true scope and content of this invention.

I claim:

1. A reconfigurable vehicle monitoring arrangement comprising:
    an aircraft structure;
    a housing securable relative to the aircraft structure;
    a communication base at least partially disposed within the housing; and
    at least one universal connector assembly configured to selectively operatively connect the communication base with a plurality of different modules, at least one of the modules configured to communicate data gathered from a plurality of aircraft data sources through the at least one universal connector assembly to the communication base, wherein the plurality of different modules comprises a first module operatively connected to a first sensor group that monitors temperatures of a gas turbine engine and a second module operatively connected to a second sensor group that monitors vibrations of a gas turbine engine.

2. The arrangement of claim 1 wherein the at least one universal connector assembly comprises a bus connector portion of the communication base configured to selectively operatively connect to a corresponding bus connector portion on each of the plurality of different module types, wherein the corresponding bus connector portion is configured to communicate data from the plurality of aircraft data sources to the bus connector portion of the communication base.

3. The arrangement of claim 2 wherein the communication base is configured to power the different types of modules through the bus connector portion when the modules are operatively connected to the communication base.

4. The arrangement of claim 1 wherein at least one of the modules is in communication with at least one sensor that gathers data from at least one of the plurality of aircraft data sources.

5. The arrangement of claim 1 wherein at least one of the modules has a portion that extends outside the housing when operatively connected to the communication base.

6. The arrangement of claim 1 wherein one of the modules is a vibration monitoring module and another of the modules is a temperature monitoring module.

7. The assembly of claim 6 wherein the vibration monitoring module is configured to communicate with vibration sensors and the temperature monitoring module is configured to communicate with temperature sensors.

8. The arrangement of claim 1 wherein the module operatively connected to the at least one universal connector assembly is physically located within the housing.

9. The arrangement of claim 1, wherein each of the plurality of different modules includes a common bus connector portion.

10. The arrangement of claim 1, wherein each of the plurality of different modules includes a local processor.

11. A modular vehicle monitoring system for an aircraft comprising:
    an aircraft structure;
    a housing that is secured to the aircraft structure;
    a communication base;
    a first module;
    a second module; and
    a universal connector, wherein the communication base is configured to selectively engage the first module, the second module, or both using the universal connector, wherein at least one of the first module and the second module is configured to communicate data gathered from a plurality of aircraft data sources through the universal connector to the communication base, wherein the first module is operatively connected to a first sensor group that monitors temperatures of a gas turbine engine and the second module is operatively connected to a second sensor group that monitors vibrations of a gas turbine engine.

12. The system of claim 11 wherein the universal connector is a bus connector.

13. The system of claim 11 wherein the communication base includes a first portion of the universal connector, and the first module and the second module each include a corresponding second portion of the universal connector.

14. The system of claim 11 wherein the first module is configured to gather data from at least one first type of aircraft data sources and the second module is configured to gather data from at least one second type of aircraft data sources different from the first type of aircraft data sources.

15. The system of claim 11 wherein the data communicates from the first module to the communication base through the universal connection.

16. The system of claim 11 wherein the first module is operatively connected to at least one first sensor, and the second module is operatively connected to at least one second sensor, the at least one first sensor configured to gather data from the aircraft that is different than data that is gathered by the second sensor.

17. The system of claim 11 wherein the first module, the second module, or both, are positioned within the housing when engaging the communication base through the universal connector.

18. The system of claim 11, wherein the first module and the second module each include a local processor.

* * * * *